(12) United States Patent
Matsumoto

(10) Patent No.: US 9,887,059 B2
(45) Date of Patent: *Feb. 6, 2018

(54) GLASS WELDING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 122 days.

This patent is subject to a terminal disclaimer.

(21) Appl. No.: 13/511,754

(22) PCT Filed: Sep. 17, 2010

(86) PCT No.: PCT/JP2010/066145
§ 371 (c)(1),
(2), (4) Date: Jun. 13, 2012

(87) PCT Pub. No.: WO2011/065112
PCT Pub. Date: Jun. 3, 2011

(65) Prior Publication Data
US 2012/0240633 A1    Sep. 27, 2012

(30) Foreign Application Priority Data

Nov. 25, 2009 (JP) .................. 2009-267825

(51) Int. Cl.
*H01J 9/26* (2006.01)
*B23K 26/00* (2014.01)
(Continued)

(52) U.S. Cl.
CPC .......... *H01J 9/261* (2013.01); *B23K 26/0006* (2013.01); *B23K 26/18* (2013.01);
(Continued)

(58) Field of Classification Search
CPC ......... B32B 17/00–17/06; C03C 27/00–27/06; C03B 23/20–23/24
(Continued)

(56) References Cited

U.S. PATENT DOCUMENTS 3,453,097 A    7/1969    Hafner
3,663,793 A    5/1972    Petro et al.
(Continued)

FOREIGN PATENT DOCUMENTS

CN    1329395    1/2002
CN    1738777    2/2006
(Continued)

OTHER PUBLICATIONS

Yasui, Hideaki, Method for Manufacturing Image Display Device, Manufacturing Apparatus, and Image Display Device Manufactured by Using the Same. Translated by: The McElroy Translation Company Jun. 2012.*
(Continued)

*Primary Examiner* — Jodi C Franklin
(74) *Attorney, Agent, or Firm* — Drinker Biddle & Reath LLP

(57) ABSTRACT

A glass layer 103 containing a binder, a laser-light-absorbing pigment, and a glass frit 102 is irradiated with laser light L2, so as to gasify the binder and melt the glass fit 102, thereby fixing the glass layer 103 to a glass member 104. This allows the glass layer 103 fixed to the glass member 104 to let out the binder and enhance the laser light absorptance, so as to yield a uniform state. As a result, fusing glass members 104, 105 to each other with the glass layer 103 having such a stable state interposed therebetween allows the glass members 104, 105 to have a uniform fusing state therebetween.

2 Claims, 24 Drawing Sheets

(51) Int. Cl.
  *C03B 23/20* (2006.01)
  *C03C 27/06* (2006.01)
  *B23K 26/18* (2006.01)
  *C03B 23/24* (2006.01)
  *B23K 103/00* (2006.01)

(52) U.S. Cl.
  CPC ............ *C03B 23/245* (2013.01); *C03C 27/06* (2013.01); *B23K 2203/54* (2015.10); *Y02P 40/57* (2015.11)

(58) Field of Classification Search
  USPC .................................. 65/43–44, 156; 156/99
  See application file for complete search history.

(56) References Cited

U.S. PATENT DOCUMENTS

| | | | |
|---|---|---|---|
| 4,339,257 A * | 7/1982 | Ueda | C03B 23/0302 65/106 |
| 4,343,833 A | 8/1982 | Sawae et al. | |
| 5,489,321 A | 2/1996 | Tracy et al. | |
| 6,565,400 B1 | 5/2003 | Lee et al. | |
| 7,371,143 B2 | 5/2008 | Becken et al. | |
| 7,641,976 B2 | 1/2010 | Lamberson et al. | |
| 7,820,941 B2 | 10/2010 | Brown et al. | |
| 7,834,550 B2 | 11/2010 | Lee et al. | |
| 7,932,670 B2 | 4/2011 | Yoo et al. | |
| 8,063,561 B2 | 11/2011 | Choi et al. | |
| 8,440,479 B2 | 5/2013 | Nguyen et al. | |
| 8,490,434 B2 | 7/2013 | Watanabe et al. | |
| 8,516,852 B2 | 8/2013 | Matsumoto et al. | |
| 2004/0069017 A1 | 4/2004 | Li et al. | |
| 2004/0207314 A1 | 10/2004 | Aitken et al. | |
| 2005/0103755 A1 | 5/2005 | Baker et al. | |
| 2006/0082298 A1 | 4/2006 | Becken et al. | |
| 2006/0084348 A1 | 4/2006 | Becken et al. | |
| 2007/0007894 A1 | 1/2007 | Aitken et al. | |
| 2007/0053088 A1 | 3/2007 | Kranz et al. | |
| 2007/0128967 A1 | 6/2007 | Becken et al. | |
| 2007/0170845 A1 | 7/2007 | Choi et al. | |
| 2007/0173167 A1 | 7/2007 | Choi | |
| 2008/0106194 A1 | 5/2008 | Logunov et al. | |
| 2008/0124558 A1* | 5/2008 | Boek et al. | 428/427 |
| 2008/0135175 A1 | 6/2008 | Higuchi | |
| 2008/0182062 A1 | 7/2008 | Becken et al. | |
| 2008/0254268 A1* | 10/2008 | Okahata | G03G 7/0093 428/210 |
| 2009/0071588 A1 | 3/2009 | Kimura et al. | |
| 2009/0080055 A1 | 3/2009 | Baur et al. | |
| 2009/0086325 A1* | 4/2009 | Liu et al. | 359/599 |
| 2009/0110882 A1 | 4/2009 | Higuchi | |
| 2009/0142984 A1 | 6/2009 | Logunov et al. | |
| 2009/0297861 A1* | 12/2009 | Banks | C03B 19/06 428/428 |
| 2009/0297862 A1 | 12/2009 | Boek et al. | |
| 2009/0308105 A1 | 12/2009 | Pastel et al. | |
| 2010/0006228 A1 | 1/2010 | Abe et al. | |
| 2010/0095705 A1 | 4/2010 | Burkhalter et al. | |
| 2010/0116119 A1 | 5/2010 | Bayne | |
| 2010/0129666 A1* | 5/2010 | Logunov et al. | 428/426 |
| 2010/0154476 A1 | 6/2010 | Becken et al. | |
| 2010/0227524 A1* | 9/2010 | Jung | H01L 51/5246 445/25 |
| 2010/0267307 A1 | 10/2010 | Park et al. | |
| 2010/0304513 A1 | 12/2010 | Nguyen et al. | |
| 2011/0001424 A1 | 1/2011 | Logunov et al. | |
| 2011/0061789 A1 | 3/2011 | Matsumoto | |
| 2011/0067448 A1 | 3/2011 | Matsumoto et al. | |
| 2011/0072855 A1 | 3/2011 | Matsumoto et al. | |
| 2011/0088430 A1 | 4/2011 | Matsumoto | |
| 2011/0088431 A1 | 4/2011 | Matsumoto | |
| 2011/0135857 A1 | 6/2011 | Logunov et al. | |
| 2011/0169108 A1 | 7/2011 | Gardner et al. | |
| 2011/0223360 A1 | 9/2011 | Shibuya et al. | |
| 2011/0223371 A1 | 9/2011 | Kawanami | |
| 2011/0256407 A1 | 10/2011 | Boek et al. | |
| 2011/0265518 A1 | 11/2011 | Matsumoto et al. | |
| 2012/0111059 A1 | 5/2012 | Watanabe et al. | |
| 2012/0147538 A1 | 6/2012 | Kawanami et al. | |
| 2012/0151965 A1 | 6/2012 | Matsumoto et al. | |
| 2012/0156406 A1 | 6/2012 | Banks et al. | |
| 2012/0222450 A1 | 9/2012 | Lamberson et al. | |
| 2012/0234048 A1 | 9/2012 | Matsumoto | |
| 2012/0240628 A1 | 9/2012 | Matsumoto | |
| 2012/0240629 A1 | 9/2012 | Matsumoto | |
| 2012/0240630 A1 | 9/2012 | Matsumoto | |
| 2012/0240631 A1 | 9/2012 | Matsumoto | |
| 2012/0240632 A1 | 9/2012 | Matsumoto | |
| 2012/0240633 A1 | 9/2012 | Matsumoto | |
| 2012/0247153 A1 | 10/2012 | Matsumoto | |
| 2012/0260694 A1 | 10/2012 | Matsumoto | |
| 2012/0285200 A1 | 11/2012 | Tanaka | |
| 2012/0287026 A1 | 11/2012 | Masuda | |
| 2012/0318023 A1 | 12/2012 | Shimomura | |
| 2012/0320444 A1 | 12/2012 | Baur et al. | |
| 2013/0011598 A1 | 1/2013 | Kawanami et al. | |
| 2013/0104980 A1 | 5/2013 | Sridharan et al. | |
| 2013/0111953 A1 | 5/2013 | Maloney et al. | |
| 2013/0134396 A1 | 5/2013 | Shimomura et al. | |
| 2013/0174608 A1 | 7/2013 | Takeuchi et al. | |
| 2013/0237115 A1 | 9/2013 | Choi et al. | |
| 2013/0280981 A1 | 10/2013 | Lee | |
| 2013/0314760 A1 | 11/2013 | Baur et al. | |

FOREIGN PATENT DOCUMENTS

| | | |
|---|---|---|
| CN | 1798708 | 7/2006 |
| CN | 1798710 | 7/2006 |
| CN | 1836177 | 9/2006 |
| CN | 101005915 | 7/2007 |
| CN | 101095247 | 12/2007 |
| CN | 101103429 | 1/2008 |
| CN | 101139165 | 3/2008 |
| CN | 100409392 C | 8/2008 |
| CN | 101312234 | 11/2008 |
| CN | 101386477 | 3/2009 |
| CN | 101434453 | 5/2009 |
| CN | 101501808 | 8/2009 |
| CN | 102056858 | 5/2011 |
| JP | 2-120259 | 5/1990 |
| JP | 5166462 | 7/1993 |
| JP | 2000-313630 | 11/2000 |
| JP | 2002-015108 | 1/2002 |
| JP | 2002-224871 | 8/2002 |
| JP | 2002-287107 | 10/2002 |
| JP | 2002-366050 | 12/2002 |
| JP | 2002-367514 | 12/2002 |
| JP | 2002366050 A * | 12/2002 |
| JP | 2004-182567 | 7/2004 |
| JP | 2005-007665 | 1/2005 |
| JP | 2005-213125 | 8/2005 |
| JP | 2006-151774 | 6/2006 |
| JP | 2006-524419 | 10/2006 |
| JP | 2007-90405 | 4/2007 |
| JP | 2007-264135 | 10/2007 |
| JP | 2008-115057 | 5/2008 |
| JP | 2008-115067 | 5/2008 |
| JP | 2008-127223 | 6/2008 |
| JP | 2008-527655 | 7/2008 |
| JP | 2009-123421 | 6/2009 |
| JP | 2009-196859 | 9/2009 |
| JP | 2009-196862 | 9/2009 |
| KR | 10-2001-0084380 | 9/2001 |
| KR | 10-0350323 | 3/2002 |
| KR | 10-2007-0003681 | 1/2007 |
| KR | 10-2007-0088715 | 8/2007 |
| KR | 10-2008-0010446 | 1/2008 |
| KR | 10-2008-0016457 | 2/2008 |
| TW | I495409 | 7/2002 |
| TW | 200516064 | 5/2005 |
| TW | I255934 | 6/2006 |
| TW | 200733787 | 9/2007 |
| TW | 200737370 | 10/2007 |
| TW | 200822789 | 5/2008 |

(56) References Cited

FOREIGN PATENT DOCUMENTS

| TW | 200911438 | 3/2009 |
|----|-----------|--------|
| TW | 200944908 | 11/2009 |
| WO | WO 2007/067533 | 6/2007 |
| WO | WO 2009/131144 | 10/2009 |
| WO | 2009/150976 | 12/2009 |
| WO | WO 2009-150975 | 12/2009 |
| WO | WO 2009-157281 | 12/2009 |
| WO | WO 2009-157282 | 12/2009 |

OTHER PUBLICATIONS

JP 20022366050 (Human Translation), retrieved from USPTO Translation Services and attached to the U.S. Office Action dated Apr. 25, 2013 in U.S. Appl. No. 12/994,539.
JP 2008115057 (Human Translation), retrieved from USPTO Translation Services and attached to the U.S. Office Action dated Apr. 25, 2013 in U.S. Appl. No. 12/994,539.
U.S. Office Action dated Apr. 25, 2013 that issued in U.S. Appl. No. 12/994,539 including Double Patenting Rejections on pp. 5-8.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jan. 22, 2013 that issued in U.S. Appl. No. 13/345,199 including Double Patenting Rejections on pp. 6-8.
U.S. Office Action dated Jan. 16, 2014 that issued in U.S. Appl. No. 13/511,735 including Double Patenting Rejections on pp. 4-8.
U.S. Office Action dated Jan. 22, 2014 that issued in U.S. Appl. No. 13/509,112 including Double Patenting Rejections on pp. 4-5.
U.S. Office Action dated Jan. 28, 2014 that issued in U.S. Appl. No. 13/511,688 including Double Patenting Rejections on pp. 4-8.
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Jun. 3, 2014 that issued in U.S. Appl. No. 13/511,683 including Double Patenting Rejections on pp. 5-11.
U.S. Office Action dated Jul. 1, 2014 that issued in U.S. Appl. No. 13/511,738 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Apr. 25, 2014 that issued in U.S. Appl. No. 13/511,721 including Double Patenting Rejections on pp. 2-3.
U.S. Office Action dated Jul. 31, 2014 that issued in U.S. Appl. No. 12/994,354 including Double Patenting Rejections on pp. 7-10.
U.S. Office Action dated Feb. 24, 2015 that issued in U.S. Appl. No. 13/345,199 including Double Patenting Rejections on pp. 4-14.

* cited by examiner (a)

(b)

(a)

(b)

GLASS WELDING METHOD

TECHNICAL FIELD

The present invention relates to a glass fusing method which manufactures a glass fusing structure by fusing glass members together and a glass layer fixing method therefor.

BACKGROUND ART

Known as a conventional glass fusing method in the above-mentioned technical field is a method which burns a glass layer containing a laser-light-absorbing pigment onto one glass member along a region to be fused, then superposes the other glass member on the one glass member with the glass layer interposed therebetween, and irradiates the glass layer with laser light along the region to be fused, so as to fuse the glass members to each other.

Meanwhile, typical as a technique for burning a glass layer onto a glass member is one which removes an organic solvent and a binder from a paste layer containing a glass frit, a laser-light-absorbing pigment, the organic solvent, and the binder, so as to fix the glass layer to the glass member, and then heats the glass member having the glass layer fixed thereto in a firing furnace, so as to melt the glass layer, thereby burning the glass layer onto the glass member (see, for example, Patent Literature 1).

For fixing a glass layer to a glass member, techniques for removing organic matters (organic solvents and binders) from the glass layer by irradiation with laser light instead of heating in a furnace have also been proposed (see, for example, Patent Literatures 2 and 3). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Translated International Application Laid-Open No. 2006-524419
Patent Literature 2: Japanese Patent Application Laid-Open No. 2002-366050
Patent Literature 3: Japanese Patent Application Laid-Open No. 2002-367514

SUMMARY OF INVENTION

Technical Problem

However, there has been a case where burning a glass layer onto a glass member by irradiation with laser light and fusing glass members together with the glass layers interposed therebetween makes their fused state nonuniform.

In view of such circumstances, it is an object of the present invention to provide a glass fusing method which can manufacture a highly reliable glass fusing structure and a glass layer fixing method therefor.

Solution to Problem

For achieving the above-mentioned object, the inventor conducted diligent studies and, as a result, has found out that the fusing state between glass members becomes nonuniform because of the fact that the laser light absorptance of the glass layer drastically increases when the temperature of the glass layer exceeds its melting point Tm as illustrated in FIG. 11 at the time of burning. That is, in the glass layer arranged on the glass member, scattering of light exceeding the absorption characteristic of the laser-light-absorbing pigment occurs because of the particle property of the glass fit and the like, so as to place it into a lower laser light absorptance state (e.g., it looks whiter under visible light). When the glass layer is irradiated with laser light in such a state in order to be burned onto the glass member, the glass frit loses its particle property upon melting and so forth, so that the absorption characteristic of the laser-light-absorbing pigment appears remarkably, whereby the laser light absorptance of the glass layer rises drastically (e.g., it looks darker or greener under visible light). As a consequence, a region having lower laser light absorptance is more likely to remain in the vicinity of the laser light irradiation start position in particular. Fusing the glass members to each other with the glass layer having the lower laser light absorptance region interposed therebetween makes the fusing state nonuniform in the glass fusing structure.

Further, the binder remains in the lower laser light absorptance region without fully decomposing. When glass members are fused to each other with the glass layer having such a region interposed therebetween, the glass layer solidifies before decomposition gases of the binder totally escape from the molten glass layer, since the melting point of the glass fit is higher than the decomposition point of the binder. This may form a number of bubbles in the glass layer, which, when joined together, may cause leaks in the glass layer in the glass fusing structure.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a binder, a laser-light-absorbing material, and a glass powder on the first glass member along a region to be fused; irradiating the glass layer with first laser light along the region to be fused, so as to gasify the binder and melt the glass powder, thereby fixing the glass layer to the first glass member and enhancing laser light absorptance in the glass layer; and superposing the second glass member on the first glass member having the glass layer fixed thereto with the glass layer interposed therebetween and irradiating the glass layer with second laser light, so as to fuse the first and second glass members to each other.

The glass layer fixing method in accordance with the present invention is a glass layer fixing method for manufacturing a glass-layer-fixed member by fixing a glass layer to a first glass member, the method comprising the steps of arranging the glass layer containing a binder, a laser-light-absorbing material, and a glass powder on the first glass member along a region to be fused; and irradiating the glass layer with first laser light along the region to be fused, so as to gasify the binder and melt the glass powder, thereby fixing the glass layer to the first glass member and enhancing laser light absorptance in the glass layer.

In the glass fusing method and glass layer fixing method, the glass layer containing a binder, a laser-light-absorbing material, and a glass powder is irradiated with the first laser light, so as to gasify the binder and melt the glass powder, thereby fixing the glass layer to the first glass member. This allows the glass layer fixed to the first glass member to let out the binder and enhance the laser light absorptance, so as to yield a uniform state. As a result, fusing the first and second glass members to each other with the glass layer having such a stable state interposed therebetween allows the glass members to have a uniform fusing state therebetween. Hence, the glass fusing method and glass layer fixing method can manufacture a highly reliable glass fusing structure.

Advantageous Effects of Invention

The present invention can manufacture a highly reliable glass fusing structure.

DESCRIPTION OF EMBODIMENTS

Figure 1:
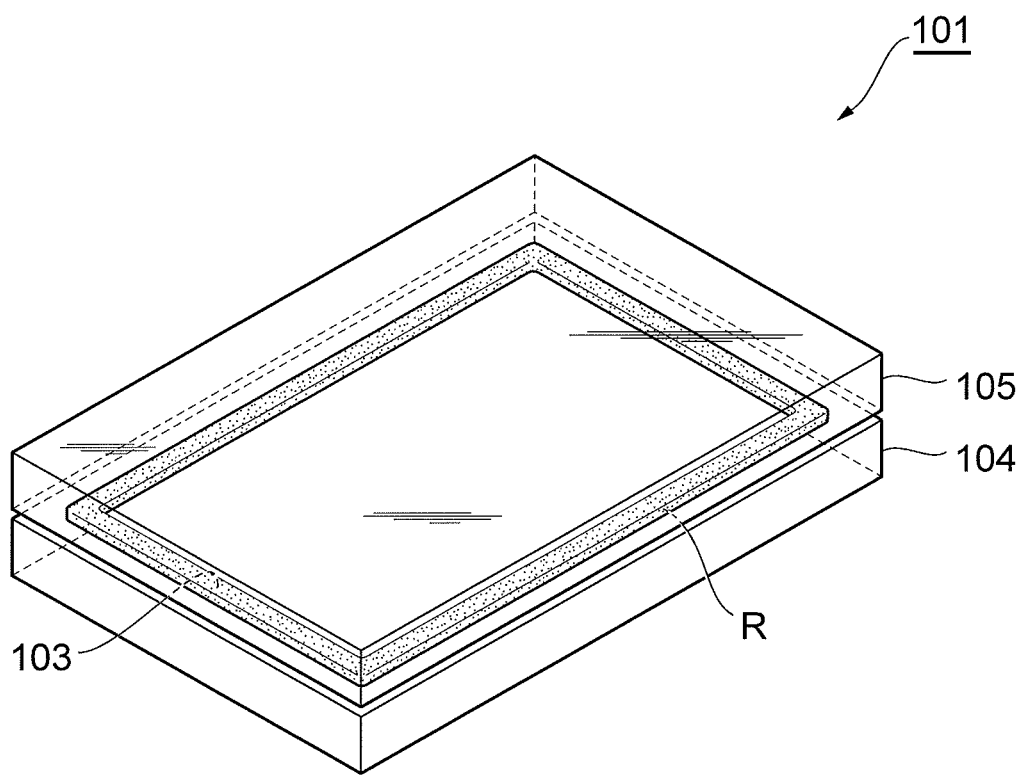
FIG. 1 is a perspective view of a glass fusing structure manufactured by the glass fusing method in accordance with a first embodiment.

In the following, preferred embodiments of the present invention will be explained in detail with reference to the drawings. In the drawings, the same or equivalent parts will be referred to with the same signs while omitting their overlapping descriptions.

First Embodiment

FIG. 1 is a perspective view of a glass fusing structure manufactured by the glass fusing method in accordance with the first embodiment. In this glass fusing structure 101, as illustrated in FIG. 1, a glass member (first glass member) 104 and a glass member (second glass member) 105 are fused to each other with a glass layer 103, which is formed along a region to be fused R, interposed therebetween. Each of the glass members 104, 105 is a rectangular sheet-shaped member having a thickness of 0.7 mm made of non-alkali glass, for example, while the region to be fused R is arranged like a rectangular ring with a predetermined width along the outer peripheries of the glass members 104, 105. The glass layer 103 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 103 to the glass member 104 in order to manufacture the glass fusing structure 101 by fusing the glass members 104, 105 to each other) for manufacturing the glass fusing structure 101 will now be explained.

Figure 2:
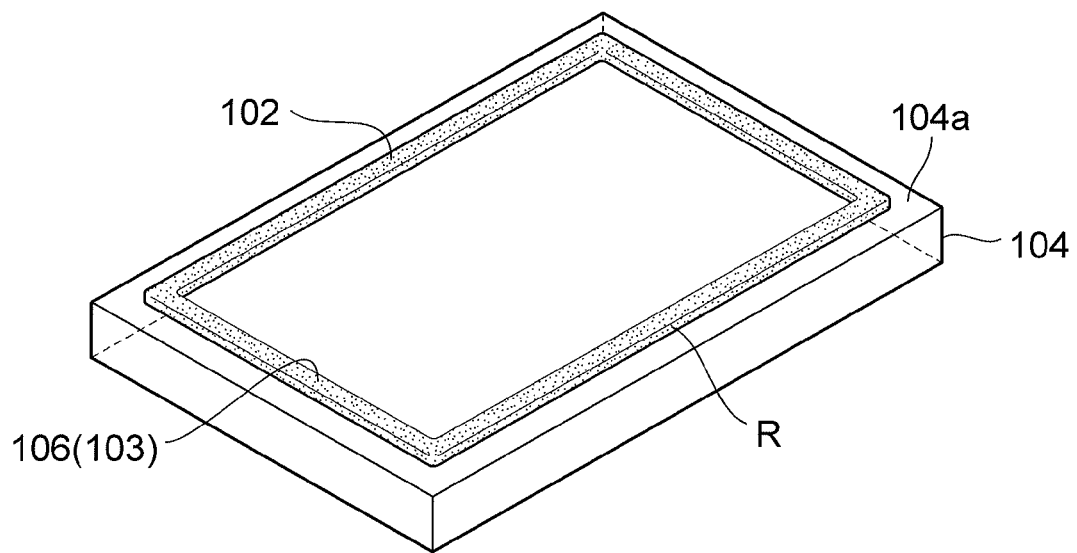
FIG. 2 is a perspective view for explaining the glass fusing method in accordance with the first embodiment.

First, as illustrated in FIG. 2, a frit paste is applied by a dispenser, screen printing, or the like, so as to form a paste layer 106 on a surface 104a of the glass member 104 along the region to be fused R. An example of the fit paste is one in which a powdery glass fit (glass powder) 102 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (nitrocellulose, ethylcellulose, acrylic, or the like) thermally decomposable at the melting point temperature of the glass or lower are kneaded. The fit paste may also be one in which a glass fit (glass powder) formed by pulverizing low-melting glass doped with a laser-light-absorbing pigment (laser-light-absorbing material) beforehand, an organic solvent, and a binder are kneaded. That is, the paste layer 106 contains the glass frit 102, laser-light-absorbing pigment, organic solvent, and binder.

Subsequently, the paste layer 106 is dried, so as to remove the organic solvent, whereby the glass layer 103 extending with a predetermined width is fixed to the surface 104a of the glass member 104 along the region to be fused R. As a consequence, the glass layer 103 containing the laser-light-absorbing pigment and glass frit 102 is arranged on the glass member 104 along the ring-shaped region to be fused R. Scattering of light exceeding the absorption characteristic of the laser-light-absorbing pigment occurs because of the particle property of the glass frit 102 and the like in the glass layer 103 fixed to the surface 104a of the glass member 104, thereby placing it into a lower laser light absorptance state (e.g., it looks whiter under visible light).

Figure 3:
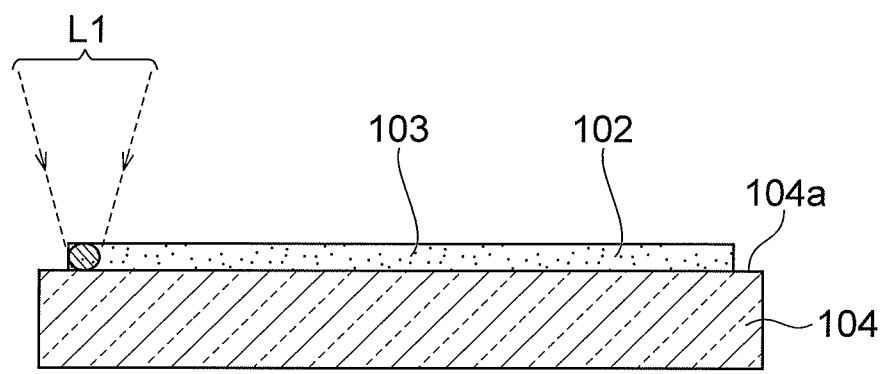
FIG. 3 is a sectional view for explaining the glass fusing method in accordance with the first embodiment.
Figure 4:
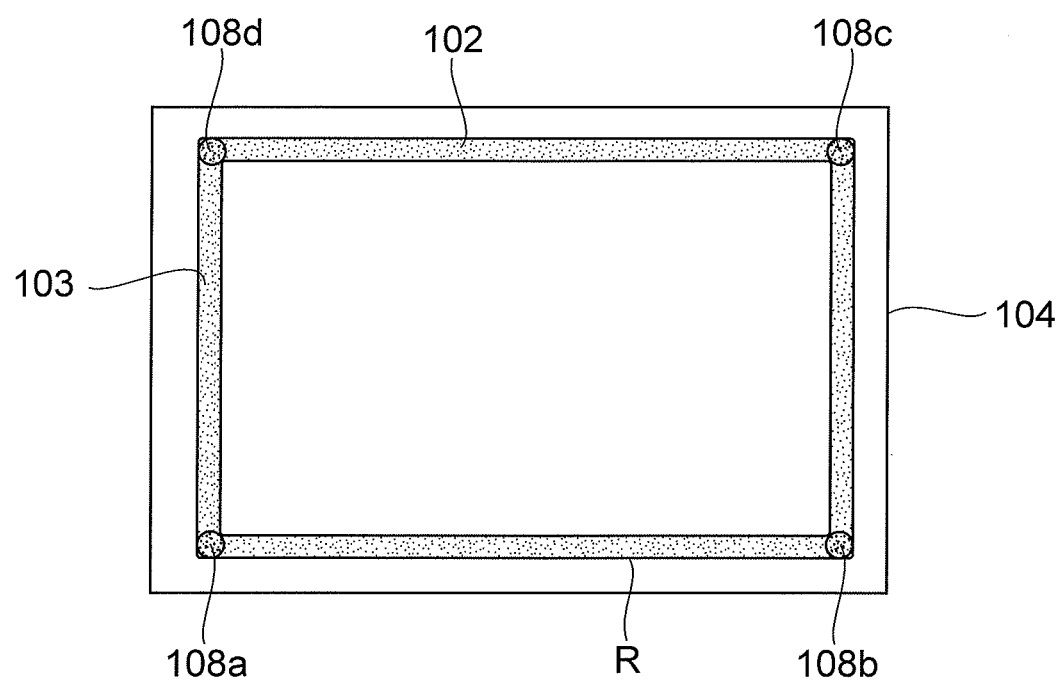
FIG. 4 is a plan view for explaining the glass fusing method in accordance with the first embodiment.

Next, as illustrated in FIG. 3, the glass layer 103 formed into a rectangular ring along the region to be fused R is irradiated with laser light L1 while locating a converging spot at one corner thereof. The spot diameter of the laser light L1 is set greater than the width of the glass layer 103, while the power of the laser light L1 irradiating the glass layer 103 is adjusted so as to be kept at about the same level in the width direction (substantially orthogonal to the advancing direction of the laser light). This melts a part of the glass layer equally in the whole width thereof, thereby forming a laser-light-absorbing part 108a having a higher laser absorptance in the whole width of this part. Thereafter, as illustrated in FIG. 4, the remaining three corners of the glass layer 103 are similarly irradiated with the laser light L1 in sequence, so as to form laser-light-absorbing parts 108b, 108c, 108d. Since the glass frit 102 melts in parts (corners) of the glass layer, thereby losing its particle property and so forth, the absorption characteristic of the laser-light-absorbing pigment appears remarkably in the laser-light-absorbing parts 108a to 108d, so that the laser light absorptance is higher in these parts than in the region not irradiated with the laser light (e.g., only the corners corresponding to the laser-light-absorbing parts 108a to 108d look darker under visible light).

Figure 5:
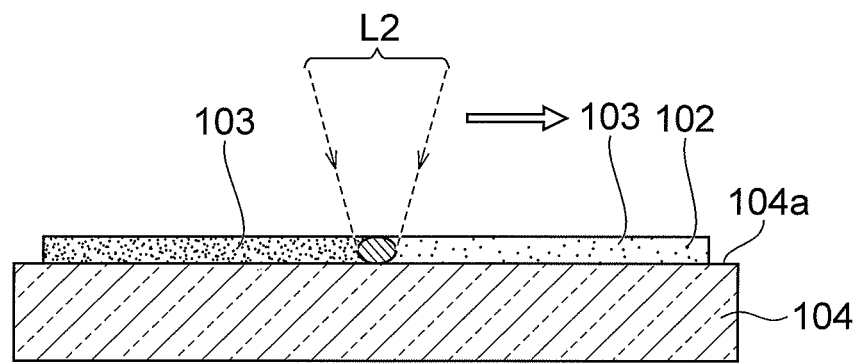
FIG. 5 is a sectional view for explaining the glass fusing method in accordance with the first embodiment.
Figure 6:
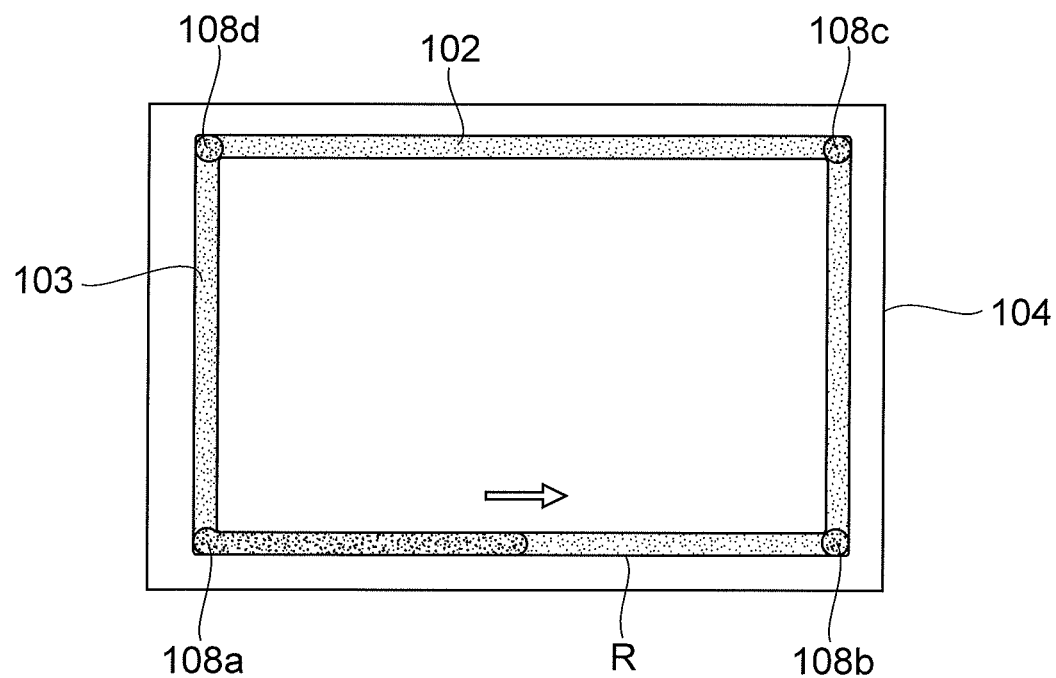
FIG. 6 is a plan view for explaining the glass fusing method in accordance with the first embodiment.

Subsequently, as illustrated in FIGS. 5 and 6, using the laser-light-absorbing part 108a illustrated at the lower left of FIG. 4 as a start point (irradiation start position), irradiation with laser light L2 is advanced in the arrowed traveling direction along the region to be fused R while locating a converging spot at the glass layer 103. This gasifies the binder all around the region to be fused R of the glass layer 103 arranged on the glass member 104 and melts the glass frit 102, so as to remove the binder and re-solidify the glass frit 102, thereby burning and fixing the glass layer 103 onto the surface 104a of the glass member 104. As a result, a glass-layer-fixed member (i.e., the glass member 104 having the glass layer 103 fixed thereto) is manufactured.

At the time of burning the glass layer 103, the irradiation with the laser light L2 is started from the laser-light-absorbing part 108a having enhanced the laser light absorptance beforehand acting as the irradiation start position, whereby the glass layer 103 is molten in the whole width thereof immediately from the irradiation start position, so as to yield a stable region with stable melting (a region where the glass layer is molten in the whole width thereof), while an unstable region (a region where the glass layer is molten only in a part thereof in the width direction) in which the melting of the glass layer 103 is unstable is reduced in the whole region to be fused R. Since the remaining three corners are also provided with the laser-light-absorbing parts 108b to 108d, respectively, the corners on which loads are likely to be exerted when functioning as the glass fusing structure reliably melt at the time of burning. In the glass layer 103 burned onto the surface 104a of the glass member 104, the glass frit 102 melts, thereby losing its particle property and so forth in the whole region to be fused R, so that the absorption characteristic of the laser-light-absorbing pigment appears remarkably, thus yielding a higher laser light absorptance state (e.g., it looks darker under visible light).

Figure 7:
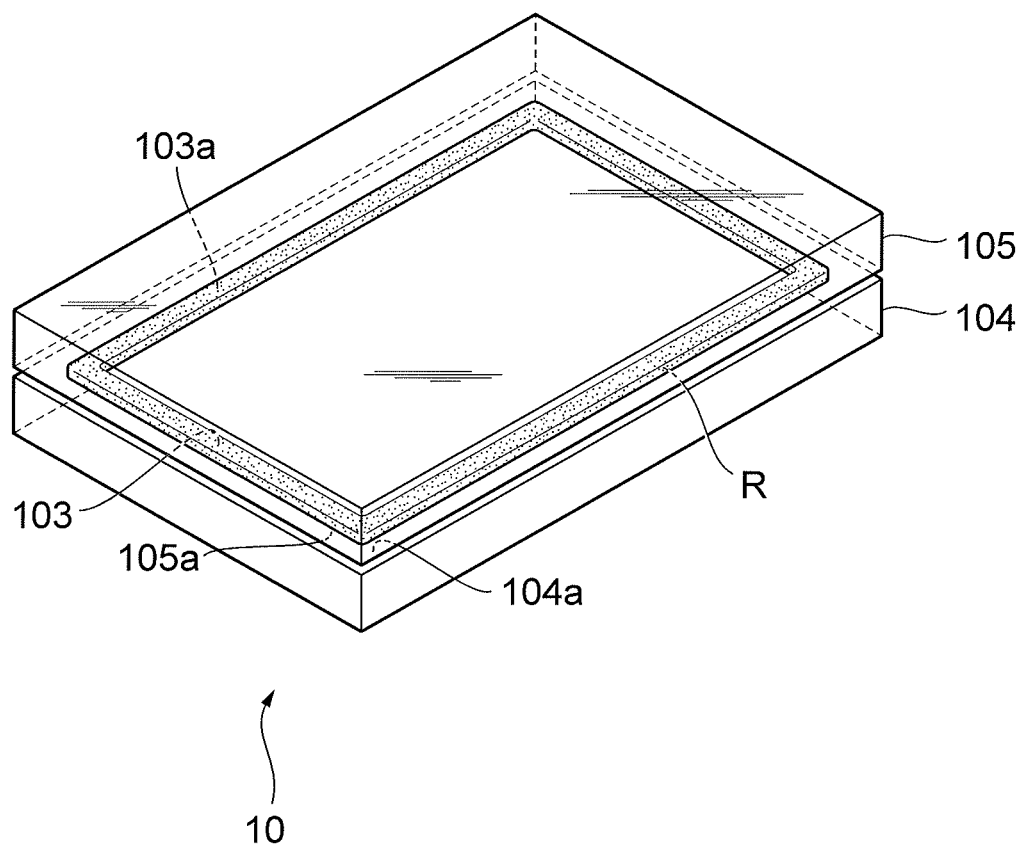
FIG. 7 is a perspective view for explaining the glass fusing method in accordance with the first embodiment.

As illustrated in FIG. 7, when stable burning of the glass layer 103 is thus completed throughout the region to be fused R, the glass member 105 is superposed on the glass-layer-fixed member 10 (i.e., the glass member 104 having the glass layer 103 fixed thereto) with the glass layer 103 interposed therebetween.

Figure 8:
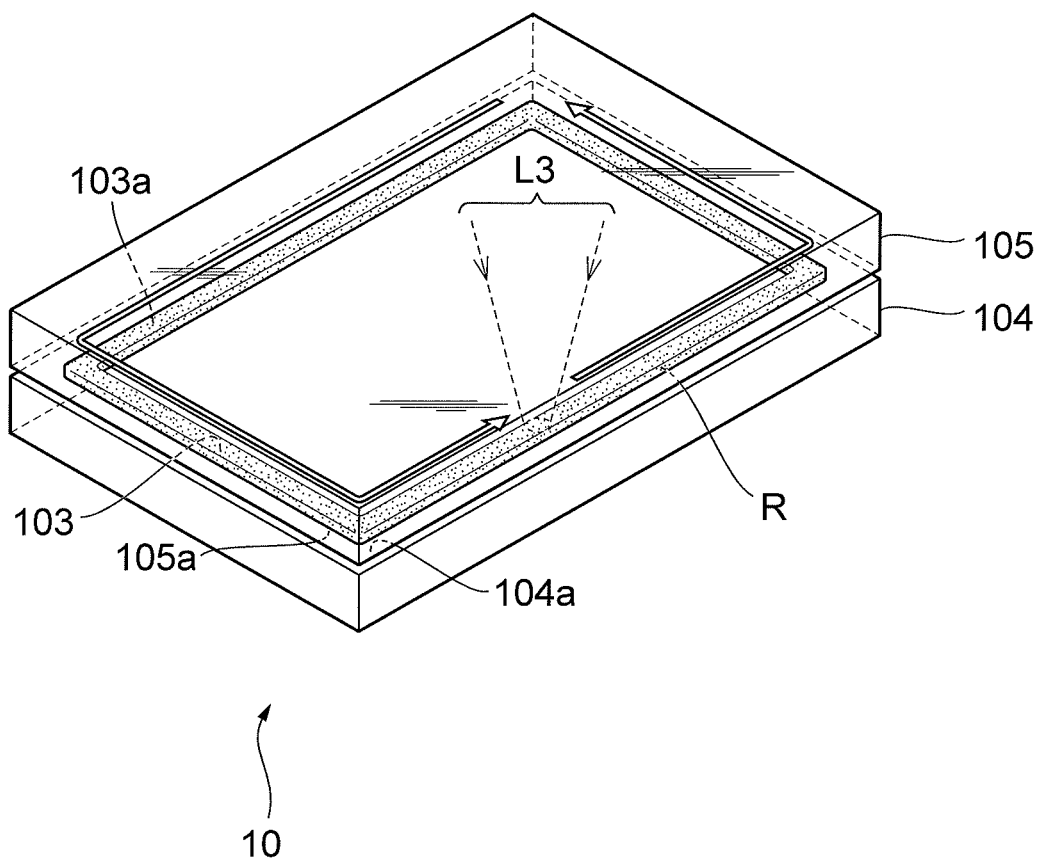
FIG. 8 is a perspective view for explaining the glass fusing method in accordance with the first embodiment.

Next, as illustrated in FIG. 8, the glass layer 103 is irradiated with laser light L3 along the region to be fused R, while locating a converging spot at the glass layer 103. As a consequence, the laser light L3 is absorbed by the glass layer 103 having a higher laser light absorptance and uniform state throughout the region to be fused R, so that the glass layer 103 and its peripheral parts (the parts of surfaces 104a, 105a of the glass members 104, 105) melt and re-solidify to about the same extent, thereby bonding the glass members 104, 105 to each other (there is also a case where not the glass members 104, 105 but the glass layer 103 melts during fusing). Here, the glass layer 103 burned onto the glass member 104 is formed as a stable region in which the melting thereof is stably carried out throughout the region to be fused R, while the binder is fully removed, whereby the glass members 104, 105 are uniformly fused along the region to be fused R.

As explained in the foregoing, the glass fusing method (including the glass layer fixing method) for manufacturing the glass fusing structure 101 irradiates the glass layer 103 containing the binder, laser-light-absorbing pigment, and glass fit 102 with the laser light L2, so as to gasify the binder and melt the glass fit 102, thereby fixing the glass layer 103 to the glass member 104. Hence, the glass layer 103 fixed to the glass member 104 lets the binder escape therefrom and attains a uniform state having a higher laser light absorptance therein. As a result, fusing the glass members 104, 105 to each other with the glass layer 103 having such a stable state interposed therebetween allows the glass members 104, 105 to have a uniform fusing state therebetween. Therefore, the foregoing glass fusing method and glass layer fixing method can manufacture the glass fusing structure 101 having high reliability.

Before melting the glass layer 103 so as to fix the glass layer 103 to the glass member 104, the above-mentioned glass fusing method irradiates a part of the glass layer 103 with the laser light L1, so as to melt a part of the glass layer 103, thereby forming the laser-light-absorbing parts 108a to 108d having a laser absorptance higher than that in the part not irradiated with the laser light L1 beforehand at the four corners of the glass layer 103. Then, using one laser-light-absorbing part 108a in the plurality of laser-light-absorbing parts 108a to 108d as the irradiation start position, the glass layer 103 is irradiated with the laser light L2 along the region to be fused R, so as to be molten and fixed to the glass member 104. Since the laser-light-absorbing part 108a thus serves as the irradiation start position with the laser light L2, a stable region with stable melting of the glass layer 103 can readily be produced from the vicinity of the start point for beginning the irradiation with the laser light L2. As a result, the glass members 104, 105 are fused to each other through the glass layer 103 formed with such a stable region and thus can easily attain a uniform fusing state therebetween.

Meanwhile, the viscosity of the glass layer tends to decrease gradually until its temperature reaches the crystallization temperature and increase gradually after the temperature exceeds the crystallization temperature. This seems to be because of the fact that a crystalline part precipitates in the molten glass layer, so that a crystal grows from the crystalline part (together with a filler constituted by ceramics or the like for adjusting the coefficient of expansion, if any, contained therein) acting as a nucleus, thereby lowering the fluidity of the glass layer. When the laser light absorptance of the molten glass layer increases drastically here, the temperature of the molten glass rises sharply together therewith, e.g., from a temperature not higher than the crystallization temperature to a temperature not lower than the crystallization temperature, whereby the viscosity of the molten glass enhances dramatically. As a result, bubbles formed by gasification of the binder are harder to be buried in the molten glass layer, so that the glass layer solidifies before decomposition gases of the binder totally escape. This may form a number of bubbles in the glass layer, which, when joined together, may cause leaks in the glass layer in the glass fusing structure. Here, when the glass layer 103 is irradiated with the laser light L2 along the region to be fused R from the laser-light-absorbing part 108a serving as the irradiation start position, so as to be molten and fixed to the glass member 104 as mentioned above, a stable region with stable melting of the glass layer 103 can readily be produced from the vicinity of the start point for beginning the irradiation with the laser light L2, so as to inhibit the glass layer 103 from being heated in excess and prevent a number of bubbles from being formed therein.

The above-mentioned glass fusing method forms the laser-light-absorbing part 108a in a part (corner) of the glass layer 103 in the whole width of the glass layer 103 in a direction intersecting the advancing direction of the laser light L2 with respect to the region to be fused R. In this case, since the laser-light-absorbing part 108a is formed in the whole width, the melting of the glass layer 103 can be stabilized further earlier. Each of the laser-light-absorbing parts 108a to 108d is formed substantially circular so that the center part in the direction intersecting the advancing direction of the laser light L2 with respect to the region to be fused R projects in the advancing direction of the laser light L2. Such a form makes the melting more uniform in the direction intersecting the advancing direction of the laser light L2.

The above-mentioned glass fusing method forms a plurality of laser-light-absorbing parts 108a to 108d intermittently along the region to be fused and uses one laser-light-absorbing part 108a in the plurality of laser-light-absorbing parts 108a to 108d as the irradiation start position. When a plurality of laser-light-absorbing parts 108a to 108d are thus intermittently formed along the region to be fused R, even in the case where the scanning speed of the laser light L2 is so fast that the melting may fail to catch up therewith, whereby an unstable region is likely to be formed, intermittently formed higher absorptance regions can continuously stabilize the melting of the glass layer 103 without returning it to the unstable state. This can increase the scanning speed, so as to shorten the manufacturing period, and improve the manufacturing yield. Also, corners where loads are likely to be exerted when the glass fusing structure is formed are provided with the laser-light-absorbing parts 108a to 108d and thus are reliably molten.

The present invention is not limited to the above-mentioned first embodiment.

For example, the laser-light-absorbing parts 108a to 108d, which are sequentially formed in the first embodiment, may be formed simultaneously by using four lasers. The step of arranging the glass layer 103 on the glass member 104 and the step of forming the laser-light-absorbing parts 108a to 108d in the glass layer 103 may be performed at substantially the same time.

Figure 9:
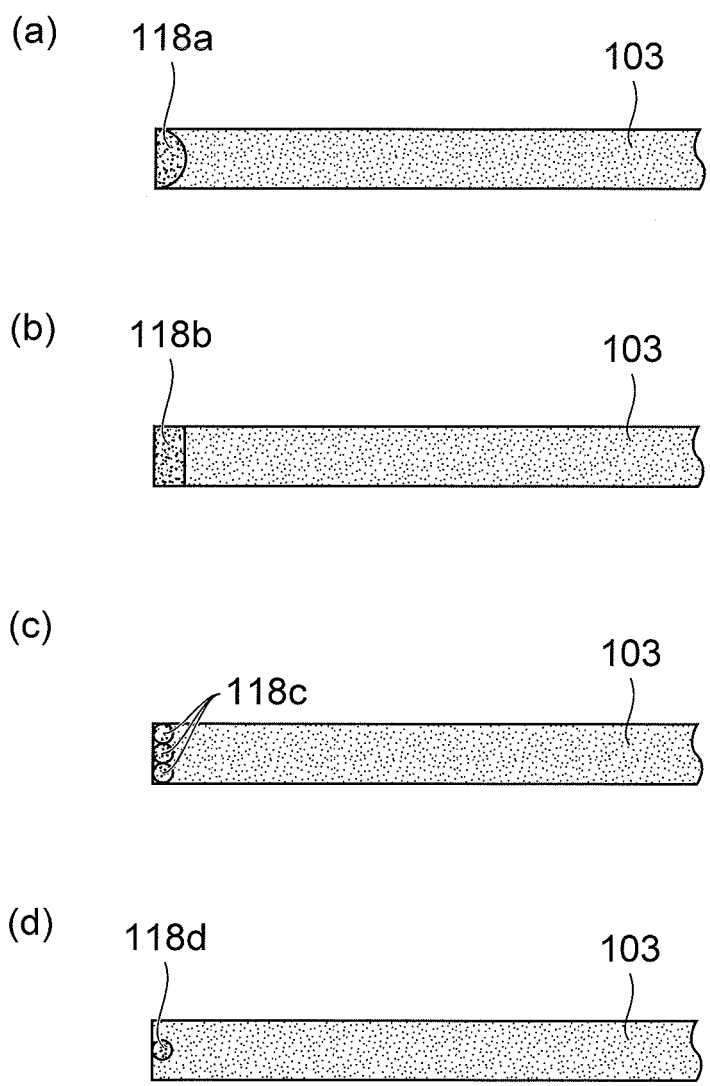
FIG. 9 is a set of diagrams illustrating modified examples of a laser-light-absorbing part.

As illustrated in FIG. 9, a semicircular laser-light-absorbing part 118a, a rectangular laser-light-absorbing part 118b, a laser-light-absorbing part 118c constituted by a plurality of circles formed in the width direction, a laser-light-absorbing part 118d formed by a minute circle at a center part in the width direction, or the like may be formed, so as to serve as an irradiation start position for irradiation with the laser light L2, which burns the glass layer 103.

Figure 10:
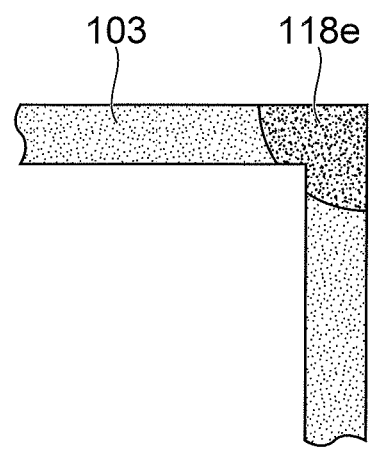
FIG. 10 is a set of diagrams illustrating other modified examples of the laser-light-absorbing part.
Figure 10:
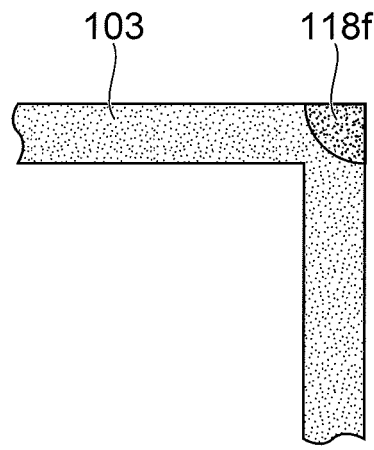
Figure 11:
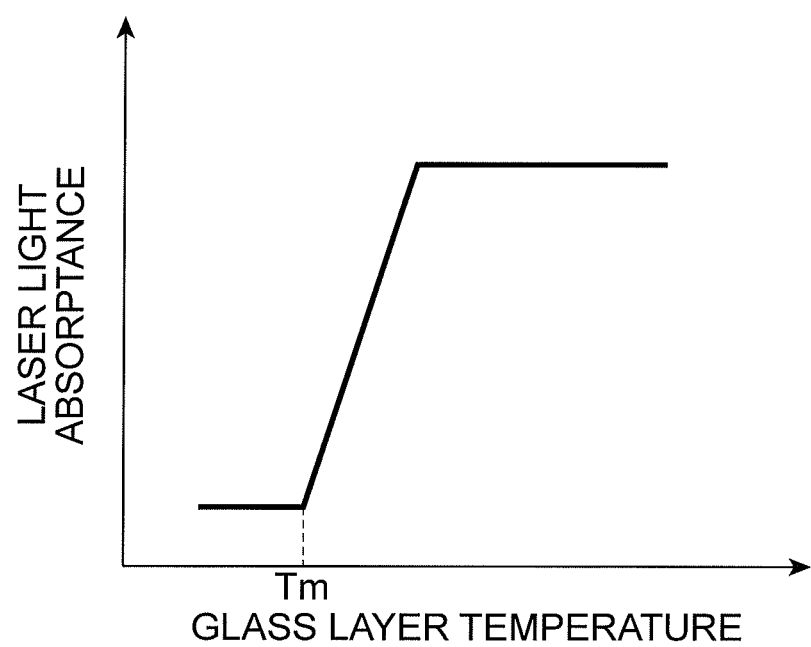
FIG. 11 is a graph illustrating the relationship between the temperature and laser light absorptance in a glass layer.

When providing a laser-light-absorbing part at a corner of the region to be fused R formed into a rectangular ring, a fan-shaped laser-light-absorbing part 118e, 118f, or the like may be formed as illustrated in FIG. 10, so as to serve as a start point for irradiation with the laser light L2, which performs burning.

When intermittently providing laser-light-absorbing parts, the laser-light-absorbing parts 108a to 108d may be disposed at the respective corners as illustrated in the above-mentioned first embodiment, or a plurality of laser-light-absorbing parts may be placed at predetermined intervals in linear parts of the glass layer 103.

The glass layer 103 may be irradiated with the laser light through the glass member 104 instead of being directly irradiated as in the first embodiment.

Second Embodiment

Figure 12:
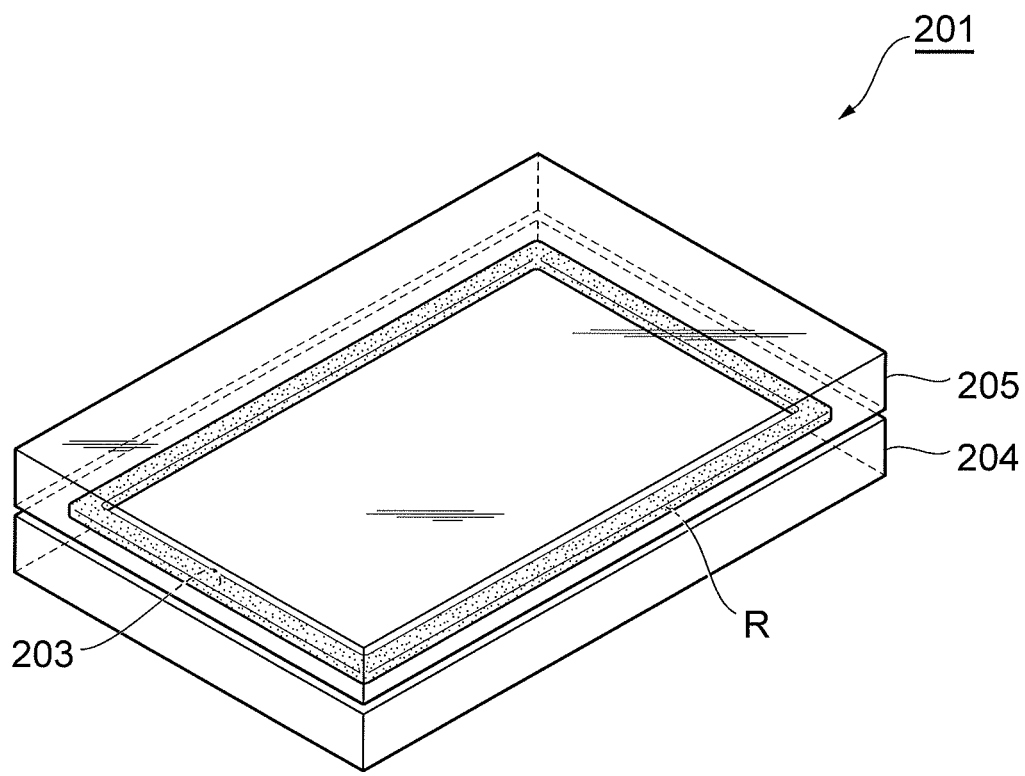
FIG. 12 is a perspective view of a glass fusing structure manufactured by the glass fusing method in accordance with a second embodiment.

FIG. 12 is a perspective view of a glass fusing structure manufactured by the glass fusing method in accordance with the second embodiment. In this glass fusing structure 201, as illustrated in FIG. 12, a glass member (first glass member) 204 and a glass member (second glass member) 205 are fused to each other with a glass layer 203, which is formed along a region to be fused R, interposed therebetween. Each of the glass members 204, 205 is a rectangular sheet-shaped member having a thickness of 0.7 mm made of non-alkali glass, for example, while the region to be fused R is set like a rectangular ring with a predetermined width along the outer peripheries of the glass layers 204, 205. The glass layer 203 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 203 to the glass member 204 in order to manufacture the glass fusing structure 201 by fusing the glass members 204, 205 to each other) for manufacturing the glass fusing structure 201 will now be explained.

Figure 13:
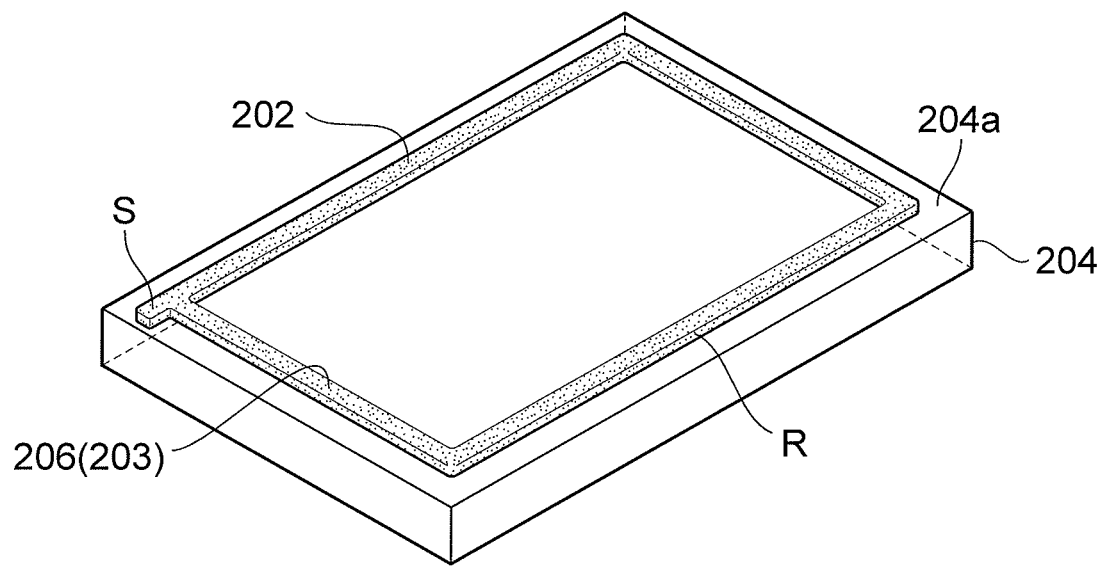
FIG. 13 is a perspective view for explaining the glass fusing method in accordance with the second embodiment.

First, as illustrated in FIG. 13, a frit paste is applied by a dispenser, screen printing, or the like, so as to form a paste layer 206 on a surface 204a of the glass member 204 along the region to be fused R and an approach region S which is connected to one corner of the region to be fused R and projects outward therefrom. An example of the fit paste is one in which a powdery glass frit (glass powder) 202 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (nitrocellulose, ethylcellulose, acrylic, or the like) thermally decomposable at the melting point temperature of the glass or lower are kneaded. The frit paste may also be one in which a glass frit (glass powder) formed by pulverizing low-melting glass doped with a laser-light-absorbing pigment (laser-light-absorbing material) beforehand, an organic solvent, and a binder are kneaded. That is, the paste layer 206 contains the glass frit 202, laser-light-absorbing pigment, organic solvent, and binder.

Subsequently, the paste layer 206 is dried, so as to remove the organic solvent, whereby the glass layer 203 is secured to the surface 204a of the glass member 204 along the region to be fused R and the approach region S connected thereto. As a consequence, the glass layer 203 containing the laser-light-absorbing pigment and glass frit 202 is arranged on the glass member 204 along the ring-shaped region to be fused R and approach region S. Scattering of light exceeding the absorption characteristic of the laser-light-absorbing pigment occurs because of the particle property of the glass fit 202 and the like in the glass layer 203 fixed to the surface 204a of the glass member 204, thereby placing it into a lower laser light absorptance state (e.g., it looks whiter under visible light).

Figure 14:
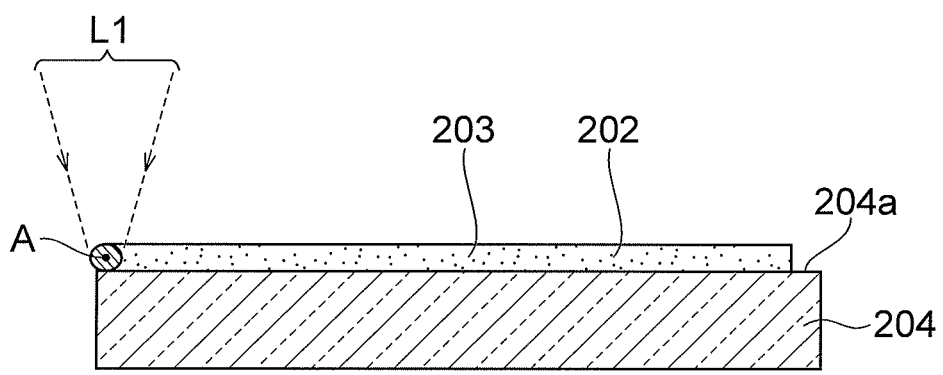
FIG. 14 is a sectional view for explaining the glass fusing method in accordance with the second embodiment.
Figure 15:
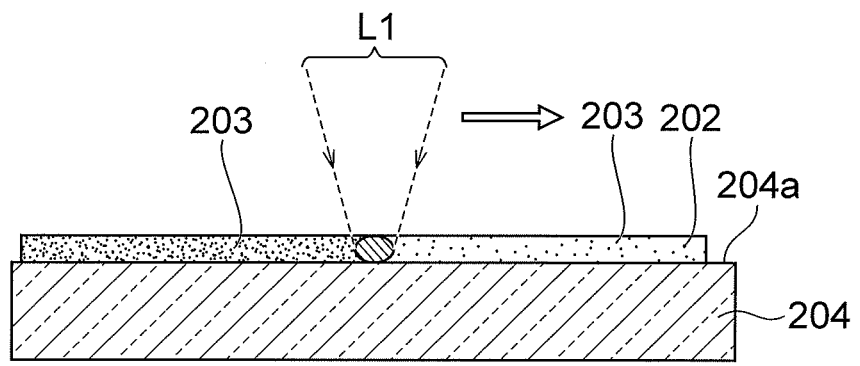
FIG. 15 is a sectional view for explaining the glass fusing method in accordance with the second embodiment.
Figure 16:
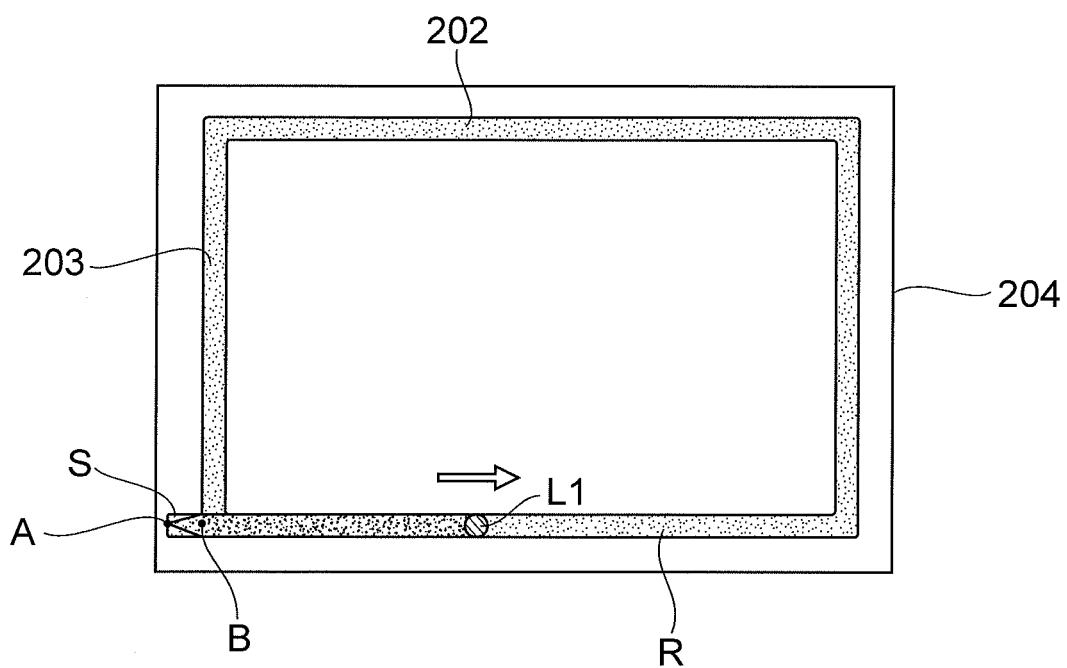
FIG. 16 is a plan view for explaining the glass fusing method in accordance with the second embodiment.

Next, as illustrated in FIGS. 14 to 16, irradiation with laser light L1 is started from an irradiation start position A in the approach region S connected to the region to be fused R in the glass layer 203 while locating a converging spot at the irradiation start position A and proceeds along the approach region S toward the region to be fused R. Meanwhile, the laser light L1 has such a temperature distribution that the temperature at the center part in the width direction (substantially orthogonal to the advancing direction of the laser light) is higher, so that melting gradually spreads in the width direction (substantially orthogonal to the advancing direction of the laser light) of the glass layer 203 as illustrated in FIG. 16 and yields a stable region in which the glass layer 203 is molten in the whole width near a connecting position B connected to the region to be fused R. That is, the approach region S arranged on the outside of the region to be fused includes the whole unstable region in which the glass layer 203 is molten in a part of its width.

Figure 17:
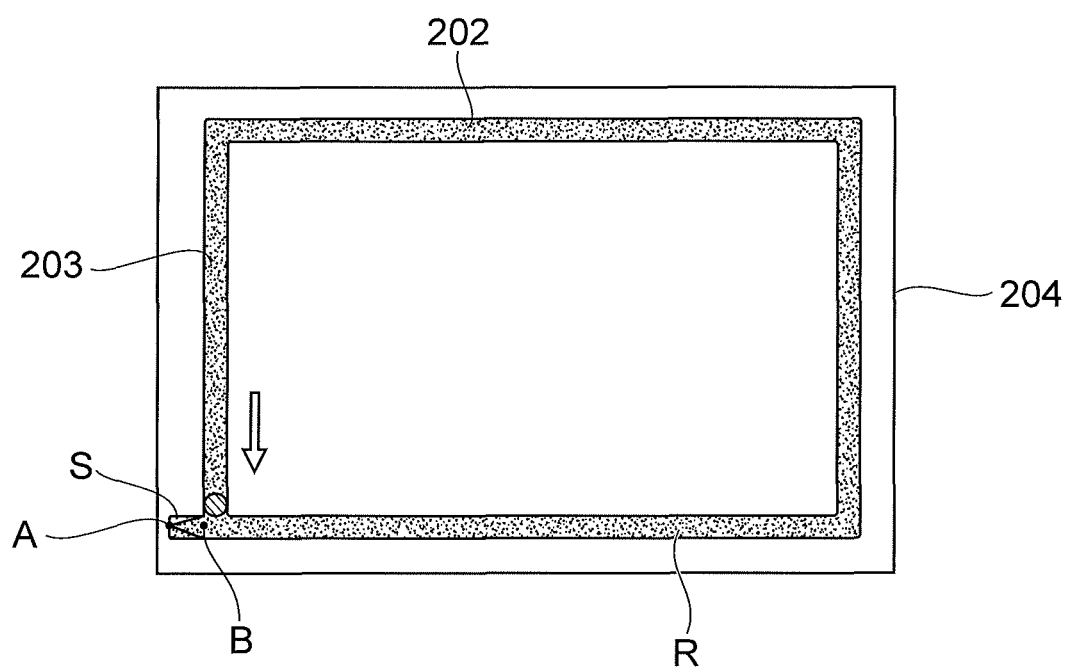
FIG. 17 is a plan view for explaining the glass fusing method in accordance with the second embodiment.

Thereafter, beyond the connecting position B between the approach region S and region to be fused R, the glass layer 203 is continuously irradiated with the laser light L1 along the region to be fused R until the laser light L1 returns to the connecting position B as illustrated in FIG. 17. This gasifies the binder all around the region to be fused R of the glass layer 203 arranged on the glass member 204 and melts the glass frit 202, so as to remove the binder and re-solidify the glass frit 202, thereby burning and fixing the glass layer 203 onto the surface 204a of the glass member 204. As a result, a glass-layer-fixed member (i.e., the glass member 204 having the glass layer 203 fixed thereto) is manufactured.

The irradiation with the laser light L1 is thus started from the irradiation start position A in the approach region S connected to the region to be fused R, so that the region to be fused R begins to melt after the irradiation attains a stable region, whereby the glass layer 203 arranged on the glass member 204 stably melts and re-solidifies all around the region to be fused R, so as to be burned onto the surface 204a of the glass member 204. In the glass layer 203 burned onto the surface 204a of the glass member 204, the glass fit 202 melts, thereby losing its particle property and so forth, so that the absorption characteristic of the laser-light-absorbing pigment appears remarkably, thus yielding a higher laser light absorptance state (e.g., it looks darker under visible light).

Figure 18:
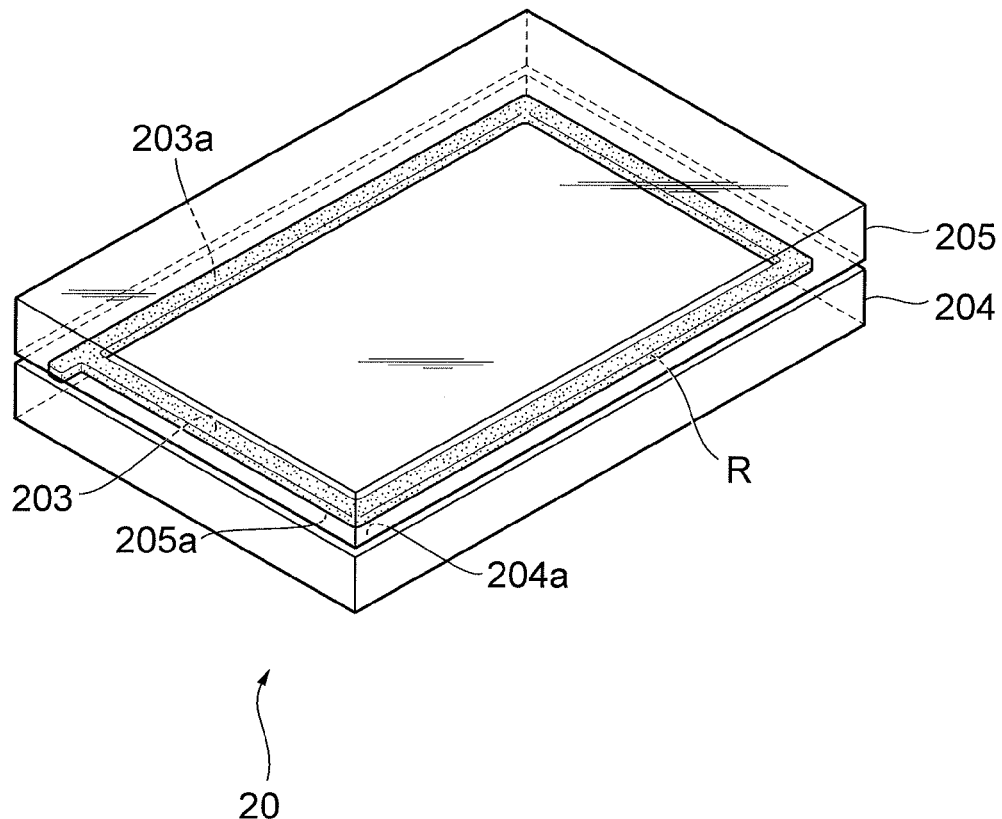
FIG. 18 is a perspective view for explaining the glass fusing method in accordance with the second embodiment.

As illustrated in FIG. 18, when stable burning of the glass layer 203 is thus completed all around the region to be fused R, the glass member 205 is superposed on the glass-layer-fixed member 20 (i.e., the glass member 204 having the glass layer 203 fixed thereto) with the glass layer 203 interposed therebetween.

Figure 19:
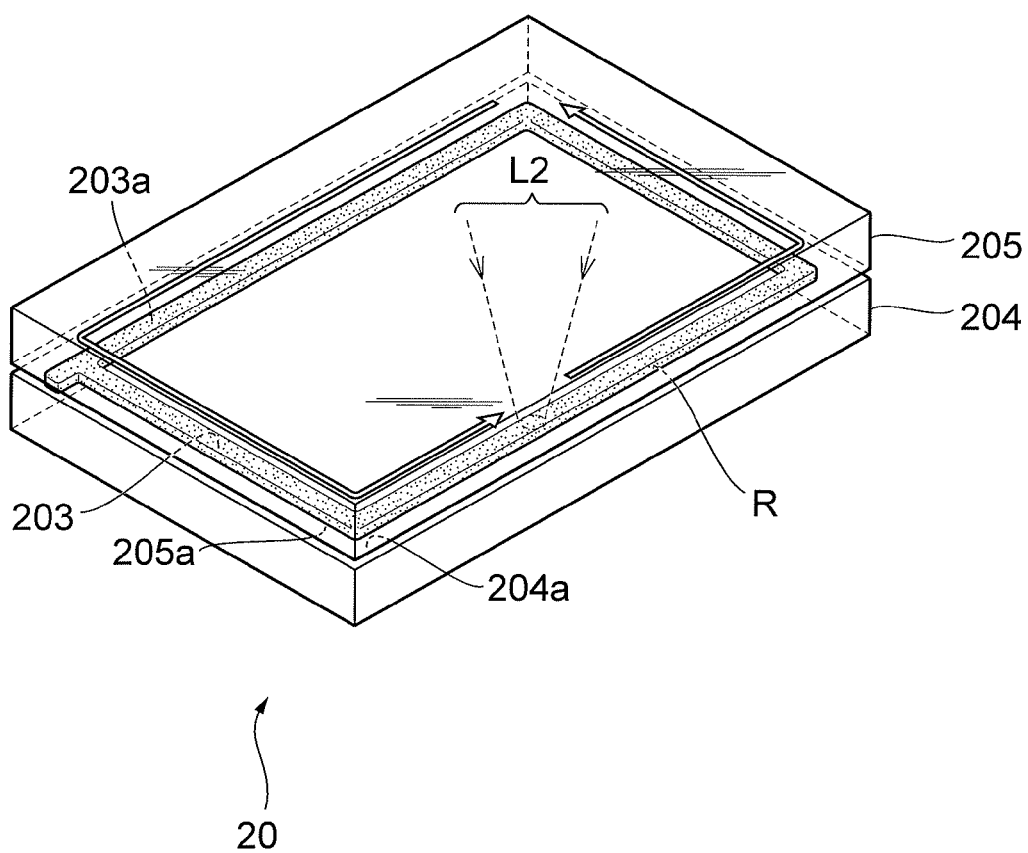
FIG. 19 is a perspective view for explaining the glass fusing method in accordance with the second embodiment.

Next, as illustrated in FIG. 19, the glass layer 203 is irradiated with laser light L2 along the region to be fused R, while locating a converging spot at the glass layer 203. As a consequence, the laser light L2 is absorbed by the glass layer 203 having a higher laser light absorptance and uniform state all around the region to be fused R, so that the glass layer 203 and its peripheral parts (the parts of surfaces 204a, 205a of the glass members 204, 205) melt and re-solidify to about the same extent, thereby bonding the glass members 204, 205 to each other (there is also a case where not the glass members 204, 205 but the glass layer 203 melts during fusing). Here, the glass layer 203 burned onto the glass member 204 is formed as a stable region in which the melting thereof is stably carried out all around the region to be fused R, while the binder is fully removed, whereby the glass members 204, 205 are uniformly fused along the region to be fused R.

As explained in the foregoing, the glass fusing method (including the glass layer fixing method) for manufacturing the glass fusing structure 201 irradiates the glass layer 203 containing the binder, laser-light-absorbing pigment, and glass fit 202 with the laser light L1, so as to gasify the binder and melt the glass frit 202, thereby fixing the glass layer 203 to the glass member 204. Hence, the glass layer 203 fixed to the glass member 204 lets the binder escape therefrom and attains a uniform state having a higher laser light absorptance therein. As a result, fusing the glass members 204, 205 to each other with the glass layer 203 having such a stable state interposed therebetween allows the glass members 204, 205 to have a uniform fusing state therebetween. Therefore, the foregoing glass fusing method and glass layer fixing method can manufacture the glass fusing structure 201 having high reliability.

When fixing the glass layer 203 to the glass member 204, the above-mentioned glass fusing method irradiates the glass layer 203 with the laser light L1 along the approach region S connected to the region to be fused R from the irradiation start position A in the approach region S, whereby the melting of the glass layer 203 spreads over the approach region S in the width direction, so as to reach the whole width thereof. That is, the approach region S includes the whole unstable region. The glass layer 203 is thus molten in the approach region S beforehand and therefore can be fixed to the glass member 204 while having an enhanced ratio of stable region in the region to be fused R, whereby the glass members 204, 205 are fused to each other with the glass layer 203 having the enhanced ratio of stable region interposed therebetween, which allows the glass members 204, 205 to have a uniform fusing state therebetween.

The above-mentioned glass fusing method arranges the approach region S on the outside of the region to be fused R shaped into a rectangular ring. This can keep powders of the glass frit and the like occurring from the unmolten part in the approach region S away from the region to be fused R. In addition, the powders produced can easily be removed by washing. Further including the step of removing such an approach region after fixing the glass layer 203 to the glass member 204 can yield the glass fusing structure 201 with an excellent exterior form.

Third Embodiment

The third embodiment of the present invention will now be explained. This embodiment relates to a glass fusing method which manufactures a plurality of glass fused bodies 201 collectively.

Figure 20:
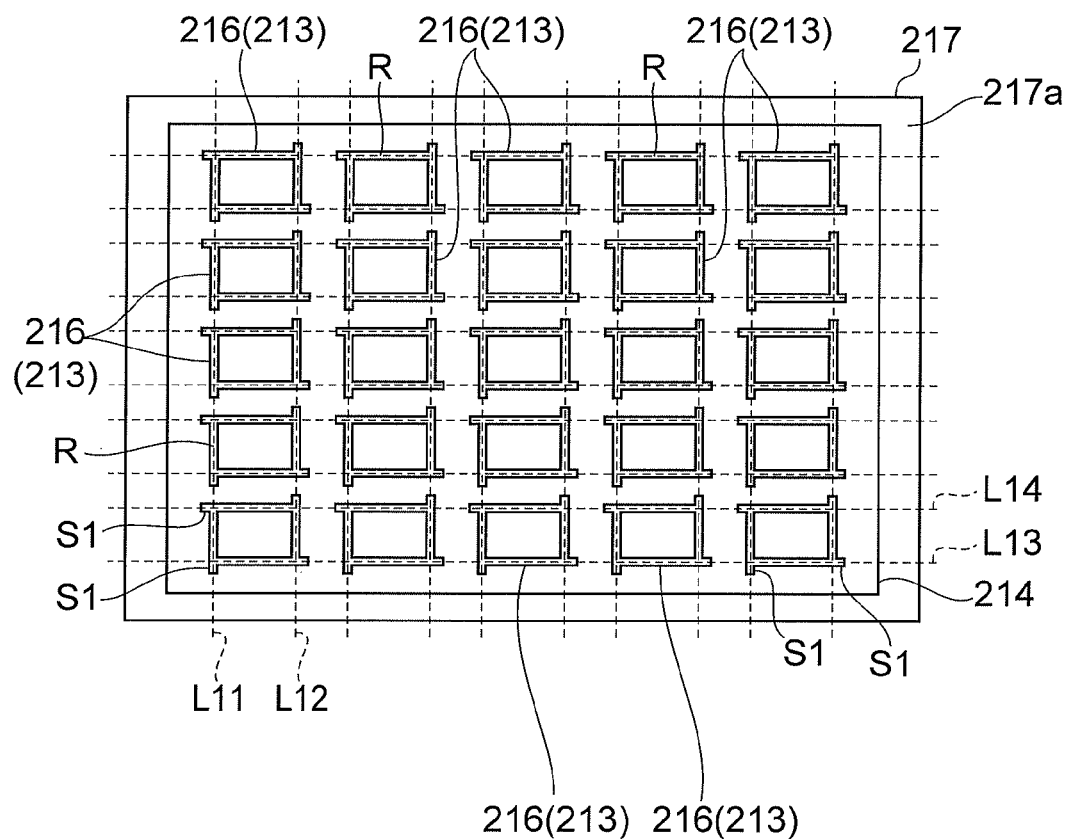
FIG. 20 is a plan view for explaining the glass fusing method in accordance with a third embodiment.

First, as illustrated in FIG. 20, a plurality of sets of regions to be fused R, each shaped into a rectangular ring, and approach regions S1 connected to the regions to be fused R are arranged into a matrix. In this embodiment, five sets of the regions to be fused R and approach regions S1 are disposed in each of the column and row directions.

Figure 21:
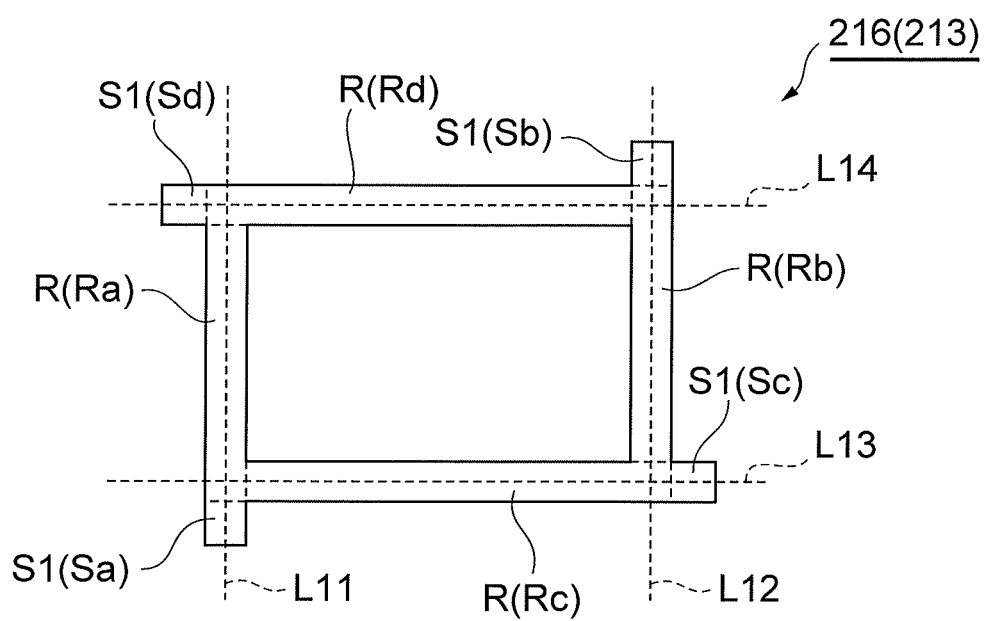
FIG. 21 is a plan view for explaining the glass fusing method in accordance with the third embodiment.

As illustrated in FIG. 21, each of the rectangular-ring-shaped regions to be fused R arranged in a matrix is constituted by a pair of regions to be fused Ra, Rb respectively extending along lines L11, L12 (first and second lines) extending in the column direction and a pair of regions to be fused Rc, Rd respectively extending along lines L13, L14 (first and second lines) extending in the row direction. The approach region S1 connected to the region to be fused R is constituted by an approach region Sa connected to one end part of the region to be fused Ra along the line L11, an approach region Sb connected to the other end part of the region to be fused Rb along the line L12, an approach region Sc connected to one end part of the region to be fused Rc along the line L13, and an approach region Sd connected to the other end part of the region to be fused Rd along the line L14.

After thus constructed regions to be fused R and approach regions S1 are arranged into a matrix while having the same orientation, the frit paste is applied thereto by a dispenser, screen printing, or the like as in the second embodiment, so as to form a plurality of paste layers 216 into a matrix along the rectangular-ring-shaped regions to be fused R and the approach regions S1 connected thereto on a surface 214a of a glass member 214 as illustrated in FIG. 20.

Subsequently, the organic solvent is removed from the paste layers 216, so as to fix glass layers 213 to the surface 214a of the glass member 214 along the regions to be fused R and the approach regions S1 connected thereto. Scattering of light exceeding the absorption characteristic of the laser-light-absorbing pigment occurs because of the particle property of the glass frit 202 and the like in each glass layer 213 fixed to the surface 214a of the glass member 214, thereby placing it into a lower laser light absorptance state (e.g., it looks whiter under visible light).

Figure 22:
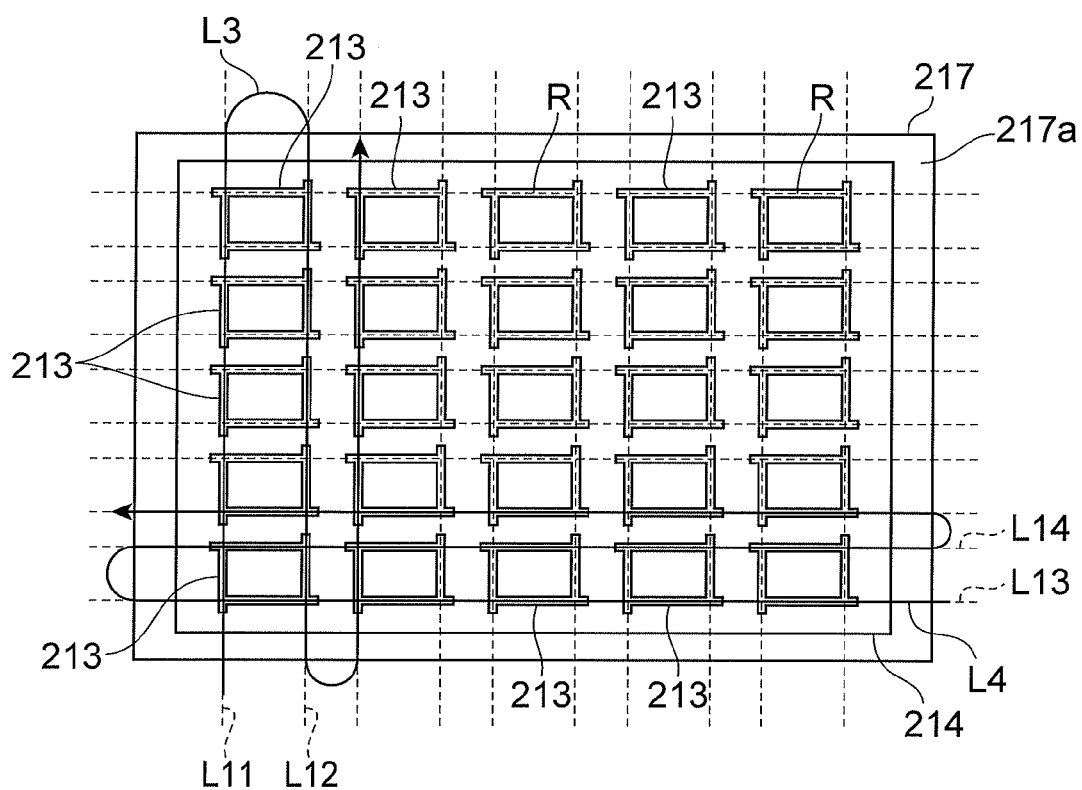
FIG. 22 is a plan view for explaining the glass fusing method in accordance with the third embodiment.

Next, as illustrated in FIG. 22, the glass layers 213 arranged in a matrix are burned onto the glass member 214.

First, laser light L3 is advanced from the lower side of the drawing (one side) to the upper side thereof (the other side) along the line L11, so as to irradiate the five regions to be fused Ra arranged with the same orientation in the column direction along the line L11 and the approach regions Sa connected to their corresponding regions to be fused Ra. When irradiating each set of the region to be fused Ra and approach region Sa with the laser light L3, the irradiation with the laser light L3 is performed along the approach region Sa from the irradiation start position therein and then continuously along the region to be fused Ra as in the second embodiment; and this process is repeated.

Subsequently, the laser light L3 is advanced from the upper side of the drawing to the lower side thereof along the line L12, so as to irradiate the five regions to be fused Rb arranged with the same orientation in the column direction along the line L12 and the approach regions Sb connected to their corresponding regions to be fused Rb. When irradiating each set of the region to be fused Rb and approach region Sb with the laser light L3, the irradiation with the laser light L3 is performed along the approach region Sb from the irradiation start position therein and then continuously along the region to be fused Rb as in the second embodiment; and this process is repeated. Such reciprocating irradiation with the laser light L3 in the column direction is similarly performed for the glass layers 213 arranged in the other columns.

Next, laser light L4 is advanced from the right side of the drawing (one side) to the left side thereof (the other side) along the line L13, so as to irradiate the five regions to be fused Rc arranged with the same orientation in the row direction along the line L13 and the approach regions Sc connected to their corresponding regions to be fused Rc. When irradiating each set of the region to be fused Rc and approach region Sc with the laser light L4, the irradiation with the laser light L4 is performed along the approach region Sc from the irradiation start position therein and then continuously along the region to be fused Rc as in the second embodiment; and this process is repeated.

Figure 23:
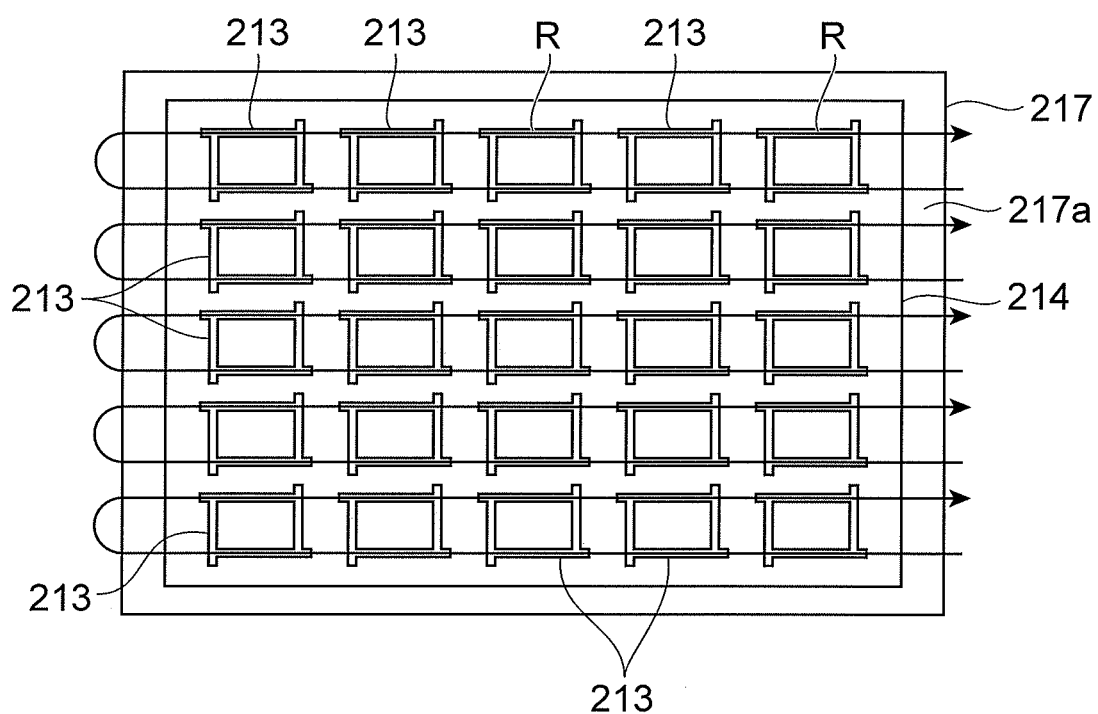
FIG. 23 is a plan view for illustrating a modified example of a laser light irradiation method in the third embodiment.

Subsequently, the laser light L4 is advanced from the left side of the drawing to the right side thereof along the line L14, so as to irradiate the five regions to be fused Rd arranged with the same orientation in the row direction along the line L14 and the approach regions Sd connected to their corresponding regions to be fused Rd. When irradiating each set of the region to be fused Rd and approach region Sd with the laser light L4, the irradiation with the laser light L4 is performed along the approach region Sd from the irradiation start position therein and then continuously along the region to be fused Rd as in the second embodiment; and this process is repeated. Such reciprocating irradiation with the laser light L4 in the row direction is similarly performed for the glass layers 213 arranged in the other rows. Such irradiation burns the glass layers 213 having an enhanced ratio of stable region collectively onto the glass member 214. Though the irradiation with the laser light L3, L4 in each of the row and column directions is performed by a single laser in the foregoing explanation, a plurality of lasers may be used simultaneously as illustrated in FIG. 23.

In each of the glass layers 203 burned onto the surface 214a of the glass member 214, the glass frit 202 melts, thereby losing its particle property and so forth, so that the absorption characteristic of the laser-light-absorbing pigment appears remarkably, thus yielding a higher laser light absorptance state (e.g., it looks darker under visible light).

When stable burning of the glass layers 213 is thus completed all around the regions to be fused R, a glass member 215 is superposed on the glass member 214 having the glass layer 213 fixed thereto (glass-layer-fixed member) with the glass layer 213 interposed therebetween. Then, the glass layers 213 are irradiated with laser light L2 along the regions to be fused R arranged in a matrix, while locating a converging spot at each glass layer 213 as in the second embodiment. As a consequence, the laser light L2 is absorbed by the glass layers 213 having a higher laser light absorptance and uniform state all around the regions to be fused R, so that the glass layers 213 and their peripheral parts (the parts of surfaces 214a, 215a of the glass members 214, 215) melt and re-solidify to about the same extent, thereby bonding the glass members 214, 215 to each other, which yields a fused body 220 (there is also a case where not the glass members 214, 215 but the glass layer 213 melts during fusing). Here, the irradiation with the laser light L2 may be performed as with the above-mentioned irradiation with the laser light L3, L4 at the time of burning the glass layer 213 onto the glass member 214.

Figure 24:
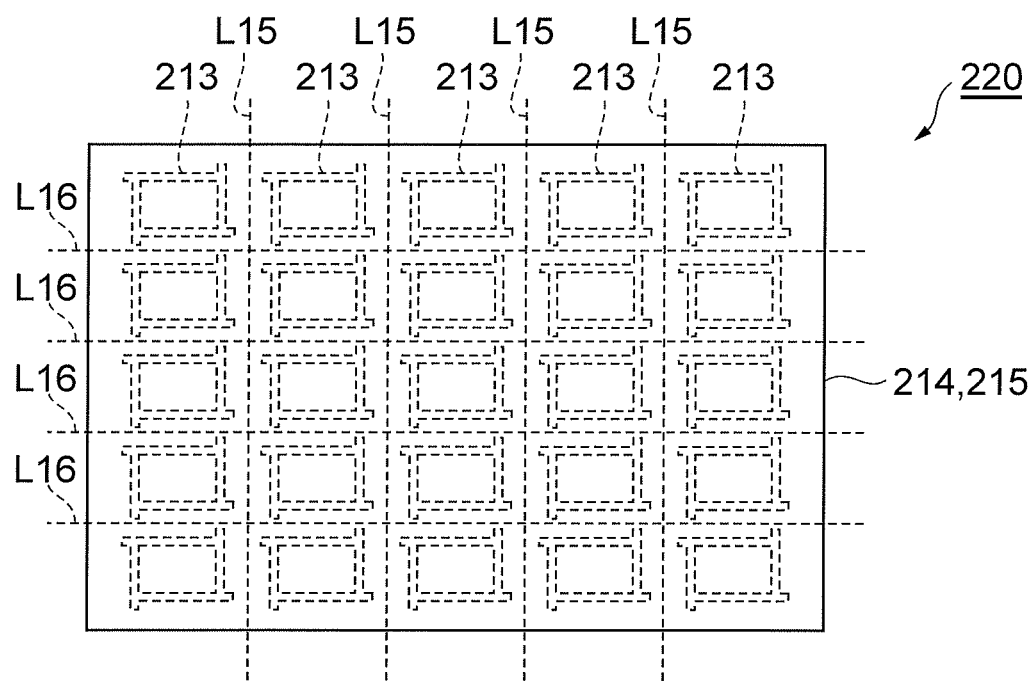
FIG. 24 is a set of diagrams for explaining the glass fusing method in accordance with the third embodiment, in which (a) and (b) are plan and sectional views, respectively.
Figure 24:
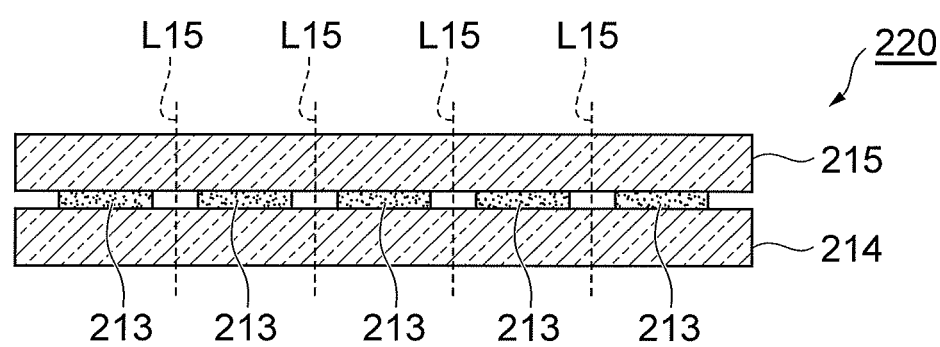

Subsequently, the fused body 220 constituted by the glass members 214, 215 is cut by a predetermined method along column directions L15 and row directions L16 as illustrated in FIG. 24. This cutting can separate the fused body 220 into individual glass fused bodies 201, whereby a plurality of glass fused bodies 201 can be obtained collectively. The cutting may be performed such as to remove the approach regions Sa to Sd from the glass fused bodies 201.

As explained in the foregoing, the glass fusing method (including the glass layer fixing method) for manufacturing the glass fusing structure 201 irradiates the glass layers 213 containing the binder, laser-light-absorbing pigment, and glass frit 202 with the laser light L1, so as to gasify the binder and melt the glass frit 202, thereby fixing the glass layers 213 to the glass member 214. Hence, the glass layers 213 fixed to the glass member 214 let the binder escape therefrom and attain a uniform state having a higher laser light absorptance therein. As a result, fusing the glass members 214, 215 to each other with the glass layer 213 having such a stable state interposed therebetween allows the glass members 214, 215 to have a uniform fusing state therebetween. Therefore, the foregoing glass fusing method and glass layer fixing method can manufacture the glass fused bodies 201 having high reliability.

The above-mentioned glass fusing method includes the step of arranging the regions to be fused Ra, Rc and the approach regions Sa, Sc connected to one end parts of the regions to be fused Ra, Rc along the lines L11, L13 extending in the column and row directions in the glass member 214 while arranging the regions to be fused Rb, Rd and the approach regions Sb, Sd connected to the other end parts of the regions to be fused Rb, Rd along the lines L12, L14 extending in the column and row directions in the glass member 214; and, at the time of irradiation with the laser light L3, L4, advances the laser light L3, L4 from one side to the other side along the lines L11, L13 and then, continuously, from the other side to the one side along the lines L12, L14. Thus advancing the laser light L3, L4 in a reciprocating manner along the lines L11, L13 and L12, L14 extending in the column and row directions can melt the glass layers 213 beforehand in the approach regions Sa to Sd and then in the regions to be fused Ra to Rd continuously in each of the regions to be fused R arranged along the lines L11, L13 and L12, L14, whereby a plurality of glass layers 213 having an enhanced ratio of stable region can be obtained efficiently.

The above-mentioned glass fusing method also includes the step of arranging a plurality of regions to be fused R and approach regions S1 connected to end parts of the regions to be fused R per line along the lines L11 to L14 extending in the column and row directions; and, at the time of irradiation with the laser light L3, L4, the laser light L3, L4 is advanced from one side to the other side or vice versa along the lines L11 to L14. Thus advancing the laser light L3, L4 along the lines L11 to L14 extending in the column and row directions can melt the glass layers 213 beforehand in the approach regions Sa to Sd and then in the regions to be fused Ra to Rd continuously in a plurality of the regions to be fused R arranged along the lines L11 to L14, whereby a plurality of glass layers 213 having an enhanced ratio of stable region can be obtained efficiently.

Since the glass members 214, 215 are fused to each other through the glass layers 213 burned onto the glass member 214 so as to reduce the unstable region as such, the fusing state between the glass members 214, 215 can be made uniform regardless of the fact that a plurality of glass layers 213 extending along the regions to be fused R are fixed thereto, whereby a plurality of glass fused bodies 201 having a favorable fusing state can be manufactured collectively.

The present invention is not limited to the above-mentioned embodiments.

For example, while the second and third embodiments use rectangular-ring-shaped regions to be fused R, the present invention is also applicable to regions to be fused shaped into circular rings. The glass layers 203, 213 may be irradiated with the laser light L1 through the glass members 204, 214 instead of being directly irradiated as in the second and third embodiments.

Though the second and third embodiments advance the laser light L1 to L4 while immobilizing the glass members 204, 205, 214, 215, it is sufficient for the laser light L1 to L4 to advance relative to the glass members 204, 205, 214, 215, whereby the glass members 204, 205, 214, 215 may be moved while immobilizing the laser light L1 to L4, or each of the laser light L1 to L4 and the glass members 204, 205, 214, 215 may be moved.

INDUSTRIAL APPLICABILITY

The present invention can manufacture a highly reliable glass fusing structure.

REFERENCE SIGNS LIST 101, 201 . . . glass fusing structure; 102, 202 . . . glass frit (glass powder); 103, 203, 213 . . . glass layer; 104, 204, 214 . . . glass member (first glass member); 105, 205, 215 . . . glass member (second glass member); 10, 20 . . . glass-layer-fixed member; R, Ra, Rb, Rc, Rd . . . region to be fused; L1 to L4 . . . laser light

The invention claimed is:

1. A glass fusing method for manufacturing a glass fusing structure by fusing first and second glass members to each other, the method comprising:
    arranging a glass layer containing a binder, a laser-light-absorbing material, and a glass powder on the first glass member along a region to be fused, the glass layer having a surface exposed to atmosphere and a melting point;
    irradiating the glass layer with a laser light along the region to be fused to a temperature greater than the melting point to gasify the binder and melt the glass powder, thereby fixing the glass layer to the first glass member and enhancing laser light absorptance in the glass layer; and
    superposing the second glass member on the surface of the glass layer and fusing the second glass member with the first glass member having the glass layer fixed thereto with the glass layer interposed therebetween and irradiating the glass layer with second laser light to fuse the first and second glass members to each other.

2. The glass layer fusing method according to claim 1, wherein the binder has a decomposition point, and the melting point of the glass layer is higher than the decomposition point of the binder.

* * * * *